(12) United States Patent
Hilgert

(10) Patent No.: US 6,736,405 B2
(45) Date of Patent: May 18, 2004

(54) FLAT GASKET FOR A RECIPROCATING ENGINE OR A DRIVEN MACHINE

(75) Inventor: Christoph Hilgert, Overath (DE)

(73) Assignee: Carl Freudenberg KG, Weinheim (DE)

(*) Notice: Subject to any disclaimer, the term of this patent is extended or adjusted under 35 U.S.C. 154(b) by 0 days.

(21) Appl. No.: 10/006,594

(22) Filed: Dec. 4, 2001

(65) Prior Publication Data
US 2002/0175478 A1 Nov. 28, 2002

(30) Foreign Application Priority Data
Dec. 6, 2000 (DE) .......................... 100 60 555

(51) Int. Cl.$^7$ ................................ F02F 11/00
(52) U.S. Cl. ................. 277/593; 277/591; 277/592
(58) Field of Search .................. 277/590–598

(56) References Cited

U.S. PATENT DOCUMENTS

| | | | | |
|---|---|---|---|---|
| 3,091,472 A | * | 5/1963 | Balfe | 277/592 |
| 4,140,323 A | | 2/1979 | Jacobs | |
| 4,203,608 A | * | 5/1980 | Nicholson | 277/595 |
| 4,428,593 A | | 1/1984 | Pearlstein | |
| 4,462,615 A | | 7/1984 | Ulmer et al. | |
| 4,799,695 A | * | 1/1989 | Yoshino | 277/592 |
| 4,807,892 A | * | 2/1989 | Udagawa | 277/595 |
| 4,896,891 A | * | 1/1990 | Udagawa | 277/593 |
| 4,898,396 A | * | 2/1990 | Udagawa | 277/592 |
| 4,948,153 A | * | 8/1990 | Takahashi et al. | 277/605 |
| 4,995,624 A | | 2/1991 | Udagawa et al. | |
| 5,150,910 A | | 9/1992 | Udagawa | |
| 5,230,521 A | * | 7/1993 | Ueta | 277/595 |
| 5,277,434 A | * | 1/1994 | Kestly et al. | 277/592 |
| 5,280,928 A | | 1/1994 | Ueta et al. | |
| 5,370,406 A | | 12/1994 | Ueta | |
| 5,382,029 A | * | 1/1995 | Udagawa et al. | 277/591 |
| 5,582,415 A | | 12/1996 | Yoshida et al. | |
| 5,803,462 A | * | 9/1998 | Kozerski | 277/595 |
| 5,951,021 A | | 9/1999 | Ueta | |
| 6,056,296 A | | 5/2000 | Ii | |
| 6,105,971 A | | 8/2000 | Hasegawa | |
| 6,135,459 A | | 10/2000 | Hiramatsu et al. | |
| 6,145,847 A | | 11/2000 | Maeda et al. | |
| 6,164,661 A | * | 12/2000 | Kakuta et al. | 277/591 |
| 6,189,895 B1 | * | 2/2001 | Yamada | 277/591 |

FOREIGN PATENT DOCUMENTS

| | | |
|---|---|---|
| DE | 42 05 824 | 9/1993 |
| DE | 43 37 757 | 5/1995 |
| DE | 195 31 232 | 2/1997 |
| DE | 195 36 718 | 4/1997 |
| DE | 195 39 245 | 4/1997 |
| DE | 197 31 491 | 1/1999 |

* cited by examiner

Primary Examiner—Anthony Knight
Assistant Examiner—Christopher Boswell
(74) Attorney, Agent, or Firm—Kenyon & Kenyon

(57) ABSTRACT

A flat gasket for a reciprocating engine or a driven machine includes at least two laminated metal sheets 0.05 to 0.5 mm thick which are provided with a coating of an elastomer film at least on the side facing outward and have an edge area, formed by the outer contour and/or at least one cylinder bore and/or a water and/or oil passage in the cylinder head, adjacent to at least one peripheral first bead of one of the metal sheets, the second metal sheet bridging the first bead, both metal sheets being joined together permanently on both sides of the first bead.

13 Claims, 6 Drawing Sheets

FLAT GASKET FOR A RECIPROCATING ENGINE OR A DRIVEN MACHINE

The present invention relates to a flat gasket for a reciprocating engine or a driven machine including at least two laminated metal sheets 0.05–0.5 mm thick which are provided with a coating of an elastomer film at least on the side facing outward and have an edge area, formed by the outer contour and/or at least one cylinder bore and/or a water or oil passage in the cylinder head, adjacent to at least one peripheral first bead of one of the metal sheets, the second metal sheet bridging the first bead.

BACKGROUND INFORMATION

Flat gaskets for internal combustion engines or driven machines are known in a variety of embodiments, e.g., from German Patents 195 39 245, 195 31 232 and 42 05 824. In the case of engines for commercial vehicles, such cylinder head gaskets have the function of sealing the joint between the cylinder head and the cylinder block. They are usually made of one or more metal sheets joined together to form a laminate and have one or more combustion chamber passage orifices and one or more liquid passage orifices, the latter permitting coolant water and/or lubricant oil to pass between the cylinder head and the cylinder block. With conventional cylinder head gaskets, a complete bead in an edge area often encloses and seals the combustion chamber passage orifices. The liquid passage orifices are often also sealed by a bead surrounding the orifice in an edge area. On installation of the cylinder head gasket, the cylinder head and the engine block are pressed together by the bias force of the cylinder screws. The beads on the flat gasket lying between them are mutually supported against the adjacent sealing surfaces of the cylinder head or the engine block. The highest specific compressive load per unit area prevails in the immediate edge area of the combustion chamber passage orifices and in the area of the cylinder head screws. Stoppers surround the combustion chamber passages and act as deformation limiters. In addition to this static compressive load, the gasket is exposed to dynamic loads in operation of the engine. The distance between the sealing surfaces is not constant over time and space. Due to the periodic explosions in the combustion chamber, the cylinder head executes vertical and horizontal movements relative to the cylinder block. The amplitude of these sealing gap movements is greater, the greater the distance of the site in question from the cylinder head screws. A stationary condition over time cannot be achieved in the sealing gap either with the combustion chamber seal or the liquid seal. For a permanent and satisfactory seal, the gasket must be able to follow these relative movements for as long as possible through an elastically flexible response. The flat gasket must not lose its sealing elastic contact with the sealing surfaces of the cylinder block or the engine block. The functional lifetime of this elastic resiliency essentially limits the service life of the gasket. After a certain number of alternating load cycles, the spring characteristics of the flat gasket are reduced. At the end of the service life, leaking occurs in the seal of the combustion chambers or the chamber passage orifices.

DESCRIPTION OF THE INVENTION

The object of the present invention is to provide a flat gasket having an improved sealing effect, a high elastic resiliency, low manufacturing costs and a long operating life.

With the flat gasket according to the present invention, at least two laminated metal sheets are provided. One of these metal sheets has a bead which surrounds the orifice of a combustion chamber or a liquid passage. The other of these metal sheets bridges this bead, with the two metal sheets being permanently joined together on both sides of the bead. Due to this connection between the metal sheets, the flat gasket retains a very good elastic resiliency over a long period of operation. The sheet metal connection may completely enclose the orifice to be sealed or it may be designed in only spots or sections around the periphery, depending on the desired spring stiffness. The connection of the two metal sheets at the base of the bead causes the distance between the legs supporting the bead at the base of the bead to be essentially maintained when there is a reduction in the sealing gap. Thus, a reduction in the sealing gap causes a tensile stress on the metal sheet bridging the bead. The deformation of the bead is limited by the connection of the metal sheets. This increases the elastic resiliency. In sealing off the combustion gas or a liquid, the sealing effect is thus improved, because even with comparatively great sealing gap movements, the contact with the adjacent sealing surface of the cylinder head or the engine block is maintained. As a result of the construction according to the present invention, an additional enclosure for the combustion chamber may be omitted. The bead constructed according to the present invention assumes the function of the combustion chamber enclosure. A stopper which limits the compressive load in the edge area of the combustion chamber enclosure may thus be omitted. At the same time, a bead designed in this way guarantees that the sealing contact will be maintained around the combustion chamber even with relative movements of the cylinder head with respect to the cylinder block. What is true of the sealing system of the combustion chamber is also true of the liquid seal. Here again, the high elastic resiliency of the bead defined at the base has the result that the flat gasket is better able to follow the horizontal and vertical movements in the sealing gap over a longer operating time. The service life of the flat gasket is extended because the pressure forces against the sealing surfaces of the cylinder head and engine block are maintained for a longer period of time.

In cross section, the bead profile may have various shapes, e.g., a U shape or a triangular shape. The spring properties as well as the frictional behavior of the flat gasket with respect to the cylinder head or cylinder block may be adapted very satisfactorily to relative movements to be expected in the sealing gap through an appropriate design of the bead cross section.

The metal sheets may be made of the same or different materials, e.g., spring steel sheets. The metal sheets may also have different thicknesses. It is of course also conceivable for other materials to be used, such as metal gauze or plastic instead of the metal sheet.

The connection of the two metal sheets may be substantive, e.g., by welding, soldering or gluing. Depending on the stiffness, the weld may be along the periphery, either continuously or as an interrupted line or spot weld. The connection may also be produced inexpensively by electron beam welding.

The second metal sheet is preferably designed to be planar. A high stiffness of the elastic recoil may be achieved in this way.

It is advantageous if the second metal sheet has at least one second bead in an area of the first bead, the second bead being especially preferably designed to be different from the first bead. The cylinder head and engine block are usually made of different materials. Since each of the beads on the main surfaces of the flat gasket is designed differently, it is possible to design the flat gasket to be different in its spring properties with regard to its contact with the engine block or the cylinder head.

With regard to the manufacture of the flat gasket, it is advantageous to design the two beads to be in mirror image.

It especially advantageous if a third metal sheet is arranged between the first metal sheet and the second metal sheet and this third metal sheet is included in the connection between the first and second metal sheets. In particular when the third metal sheet has in the area of the first bead and the second bead a third bead having a differently shaped profile, the elastic behavior of the gasket with respect to the engine block or the cylinder head may be adapted very satisfactorily even with comparatively large sealing gap movements. By dividing the first or second bead as a partial bead, a larger contact area with the sealing surface of the engine block or the cylinder head is achieved. This makes it possible to prevent the bead of the flat gasket from digging into the surface of the engine block or the cylinder head.

It may be advantageous to bridge a comparatively large sealing gap through flat gaskets stacked one above the other.

BRIEF DESCRIPTION OF THE DRAWINGS

To further illustrate the present invention, reference is made to the drawing in which figures schematically illustrate various embodiments according to the present invention.

DESCRIPTION OF THE EMBODIMENTS

Figure 1:
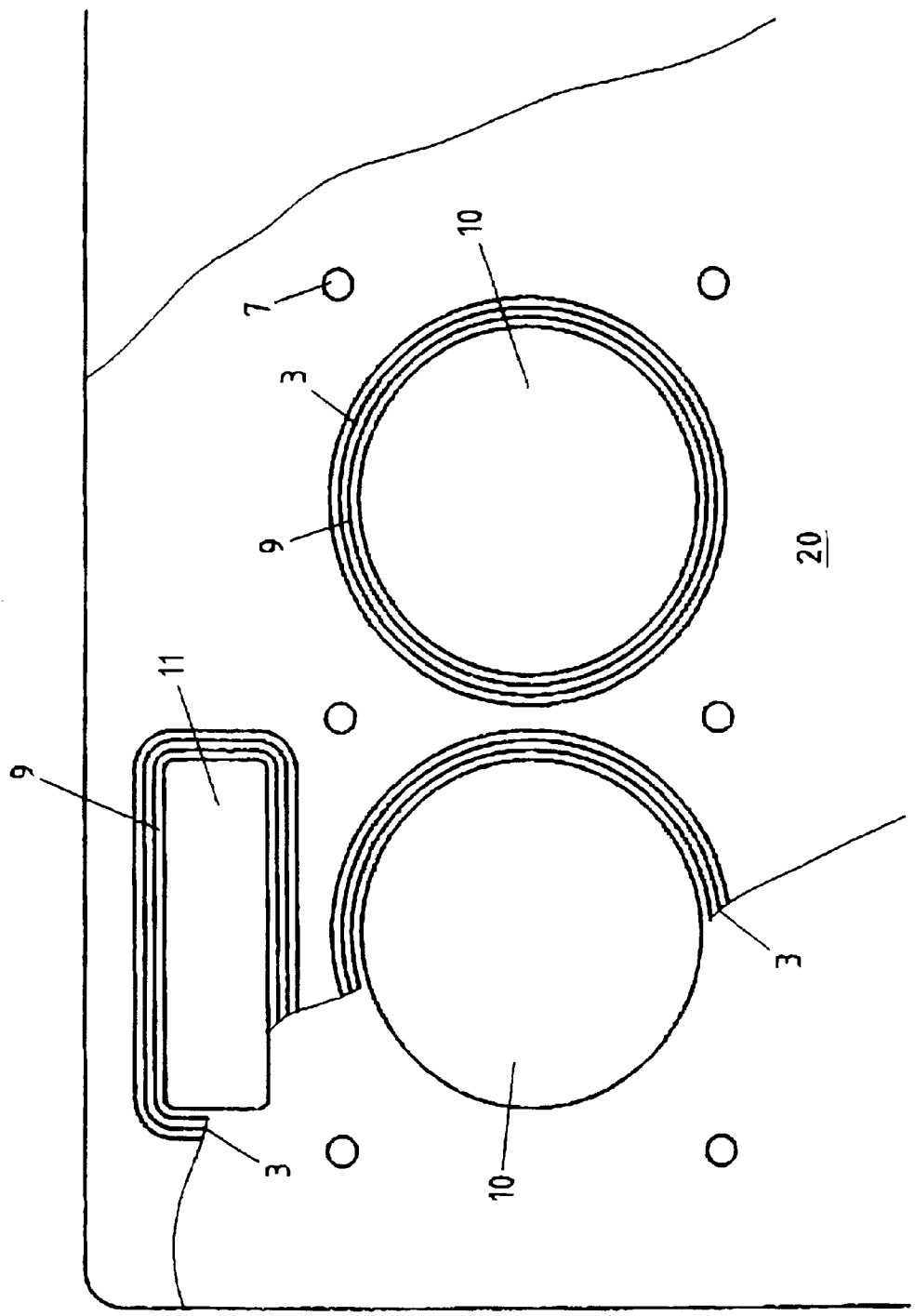
FIG. 1 shows a partially sectional top view of the flat gasket according to the present invention.

FIG. 1 shows a top view of the flat gasket according to the present invention in a partially sectional diagram. Flat gasket 20 covers the sealing surface of an engine block having cylinder bores 10 and a water or oil passage orifice 11. Each edge area 9 of orifices 11, 10 is surrounded by a bead having a triangular cross section in FIG. 1. The cylinder head and engine block are pressed together by cylinder head screws. Bores 7 for the cylinder head screws are shown in FIG. 1. The greatest compressive forces act in the area of these cylinder head screws and in the area of the edge areas of the combustion chambers. Flat gasket 20 is coated with an elastomer film 13 on the main surface facing the cylinder head and the engine block, respectively.

Figure 2:
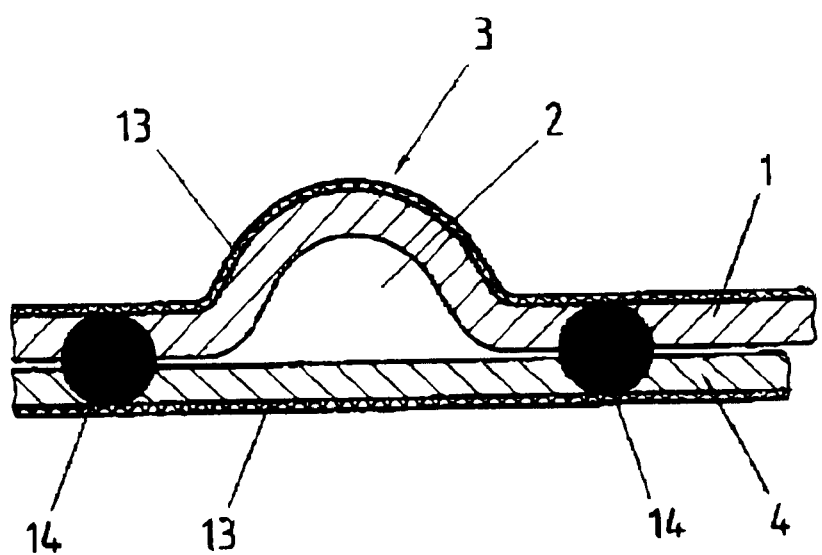
FIGS. 2 through 6 show details of sections through preferred embodiments of the flat gasket according to the present invention.

FIG. 2 shows a detail of a section through a preferred embodiment of the flat gasket according to the present invention. A first metal sheet 1 has a bead 3 designed with a U-shaped profile in cross section. A second metal sheet 4 covers the bead. Both metal sheets 1, 4 enclose a cavity 2 and are permanently joined together on both sides of bead 3. This connection 14 may be continuous or in sections, for example, depending on the desired spring stiffness. The metal sheets may be between 0.05 mm and 0.5 mm thick. A substantive connection of these metal sheets may be produced very inexpensively and to great advantage by electron beam welding, for example, with a width of slightly less than 1 mm. Due to the connection of these two metal sheets 1, 4, the deformability of bead 3 in the sealing gap is limited. A compressive force initiated by the sealing surfaces of the cylinder head and the engine block causes a thrust force to be transmitted to welded connection 14 at the base of the bead. Metal sheet 4 is subjected to tensile stress between welded connections 14. This limits a yielding movement of the base of the bead to the right or the left in FIG. 2. The result is a high elastic resiliency of bead 3. This may be adjusted through a suitable choice of materials for the metal sheet and the cross section of bead 3 so that the flat gasket forms a spacer around the combustion chamber enclosure. It is thus possible to omit the stopper, a strip of metal sheet bent in a C shape which limits the compressive load in the edge area of the combustion chamber. The main sealing surfaces of the flat gasket facing the sealing surfaces are coated with an elastomer layer 13 in a known manner. This elastomer film 13 may be applied by spraying or casting onto metal sheets 1, 4. Micro-sealing between the main sealing surfaces of the flat gasket and the sealing surfaces of the engine block and cylinder head is achieved through rubber layer 13. Due to the compressive forces acting in the sealing gap, rubber layer 13 is pressed into the surface roughness of the respective sealing surface.

Figure 3:
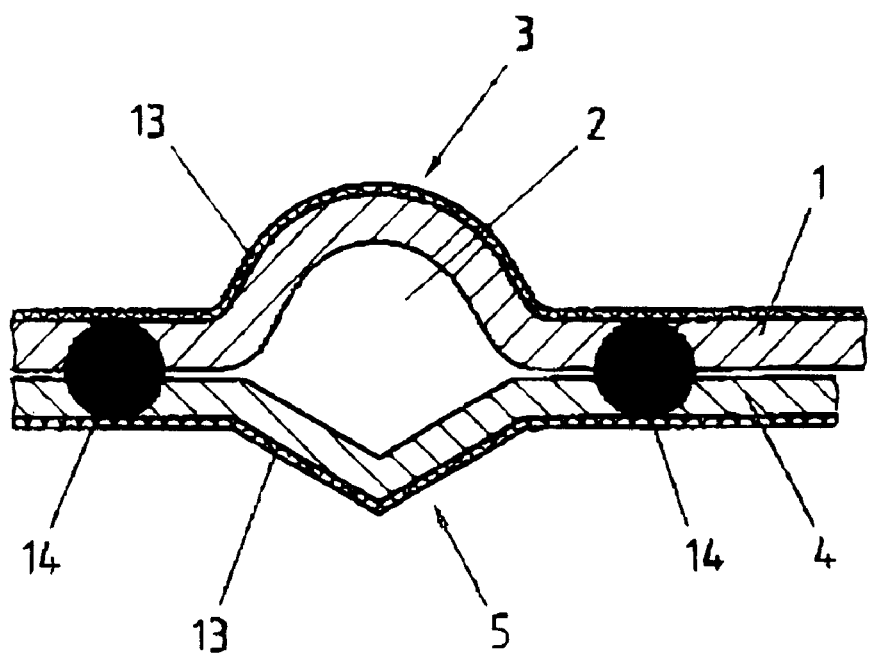

FIG. 3 shows an especially preferred embodiment as a detail of a section through the flat gasket. A first bead 3 having a semicircular cross section opposite triangular bead 5 of second metal sheet 4 is formed by first metal sheet 1. Here again, the main sealing surfaces are coated with a thin rubber layer 13. First metal sheet 1 and second metal sheet 4 are bonded substantively by weld 14 and delimit a cavity 2 which is designed around a combustion chamber orifice or water/oil passage orifice. The resiliency of the flat gasket is optimally adaptable to the vibrations of the engine block or the cylinder head through these differently designed beads 3, 5.

Figure 4:
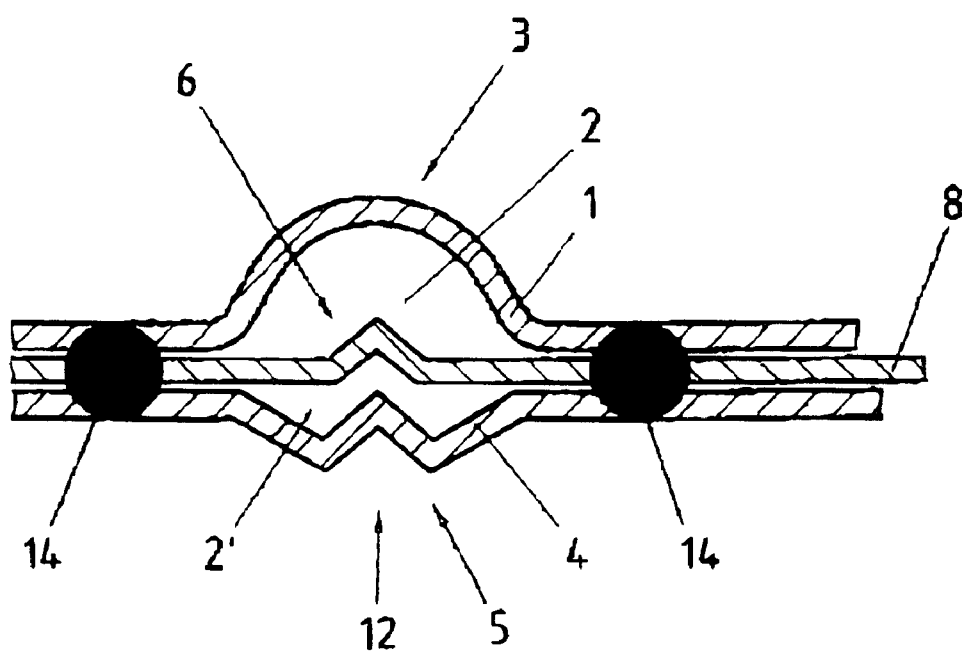

An especially preferred embodiment of the present invention is illustrated in FIG. 4 as a detail of a section through the flat gasket. A third metal sheet 8 is arranged between two metal sheets 1, 4. Connection 14 joins three metal sheets 1, 8, 4 substantively on both sides of the beads. Bead 5 of second metal sheet 4 is formed by two partial beads 12. Bead 3 of metal sheet 1 is designed with a U-shaped profile in cross section. The part of third metal sheet 8 situated between connections 14 also has a triangular bead 6. Metal sheets 1 and 8 and 4 and 8, respectively, enclose cavities 2, 2'. The embodiment according to FIG. 4 is characterized by a high elasticity. Within the limits defined by bead 6, this preferred embodiment permits connections 14 to be displaced within the limits defined by bead 6 (to the right and the left in the plane of FIG. 4) in the event of a compressive load on the flat gasket. On the other hand, the flat gasket also maintains contact with the sealing surfaces of the cylinder head or the cylinder block even when a comparatively large sealing gap must be bridged. Through the different designs of beads 5 and bead 3, the flat gasket may be adapted very satisfactorily with regard to the frictional behavior with different materials for the cylinder head and the cylinder block. The contact areas of the flat gasket with the planar sealing surfaces of the cylinder head and cylinder block may be designed so that these sealing surfaces are not damaged even after a long operating time.

Figure 5:
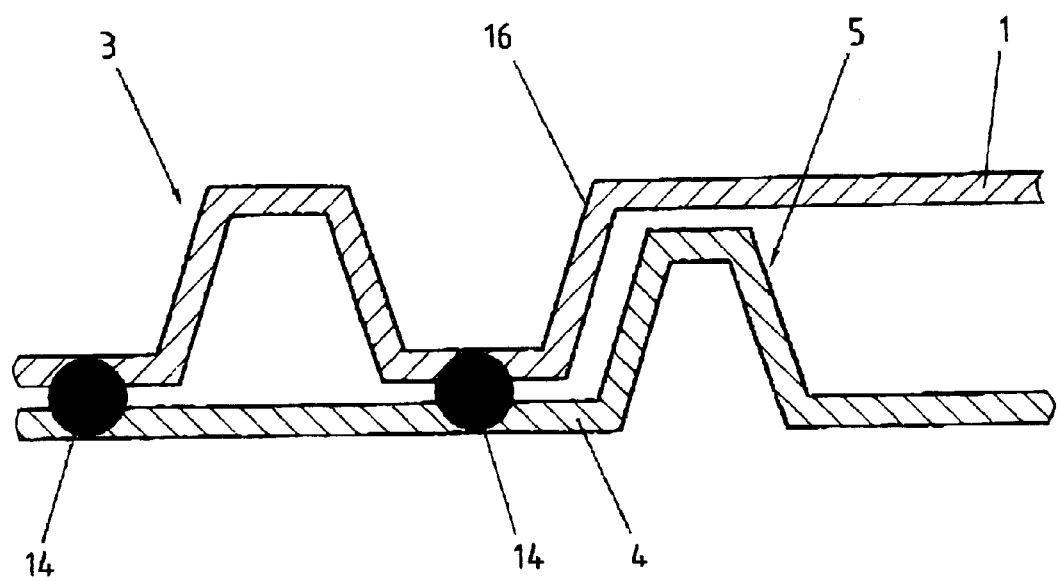
Figure 6:
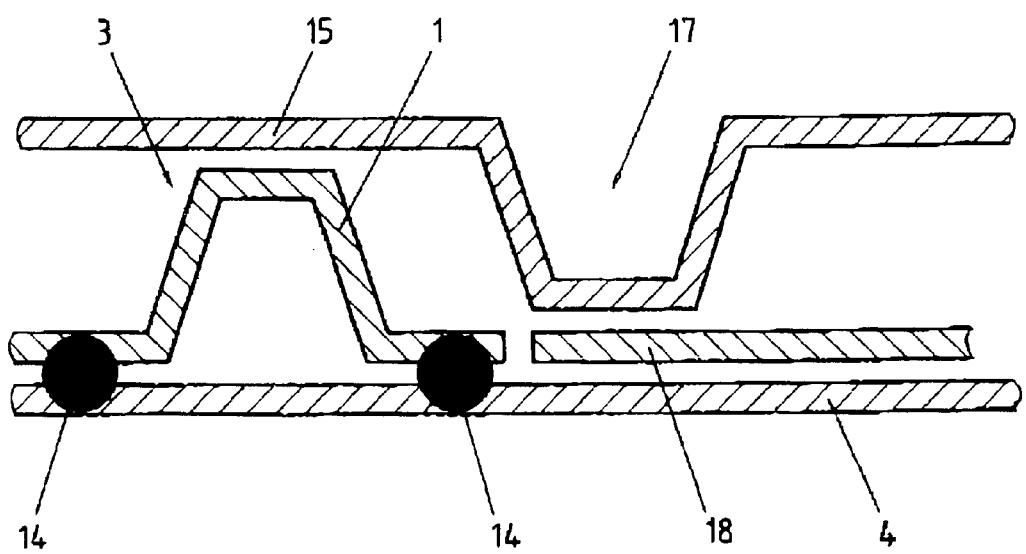

The flat gasket may of course also be formed by sealing layers which cause a stopper and/or bead function. Preferred embodiments are illustrated in FIG. 5 and FIG. 6 as examples. In FIG. 5, first metal sheet 1 has a bead 3 whose right and left legs are welded to second metal sheet 4 near the base point. First metal sheet 1 is provided with an offset 16 beneath which a bead 5 of second metal sheet 4 engages. The height of bead 5 corresponds essentially to the height of offset 16. In the event of a compressive load in the sealing gap, the elastic resiliency of bead 3 differs greatly in comparison with that of bead 5: bead 3 has a high stiffness and a lower elasticity, i.e., it acts primarily as a stopper. The stopper produces a sealing effect with respect to the combustion pressure in the combustion chamber and forms a spacer between the cylinder head and the cylinder block around the combustion chamber enclosure. The stiffness of bead 5 is softer, however, but its elasticity is comparatively greater, because its right base point yields to the right when under compression. Bead 5 produces a very good seal with respect to escaping gasses that are not blocked by the stopper. The embodiment illustrated in FIG. 5 may of course also be enclosed like a sandwich between layers of a flat gasket. In FIG. 6, outer layer 15 has a bead 17 facing second metal sheet 4. An intermediate layer 18 is arranged between bead 17 and metal sheet 4. Here again, the resiliency of bead 17 is softer in comparison with that of bead 3.

What is claimed is:

1. A flat gasket for a reciprocating engine or a driven machine having a cylinder head, comprising: at least a first laminated metal sheet (1) and a second laminated metal sheet (4) both 0.05 to 0.5 mm thick, both provided with a coating of an elastomer film at least on a side facing outward and both having an edge area, said edge area formed by at least one of an outer contour of the cylinder head, a cylinder bore or a water or oil passage in the cylinder head, said edge area adjacent to at least one peripheral first bead (3) of the first metal sheet (1), the second metal sheet (4) bridging the first bead (3), wherein the two metal sheets (1, 4) are permanently joined together by connections on both sides of the first bead (3), and wherein the second metal sheet (4) is subject to a tensile stress between the connections on both sides of the first bead (3).

2. The flat gasket according to claim 1, wherein the second metal sheet (4) is designed to be planar.

3. The flat gasket according to claim 2, wherein an outer layer (15) covers a bead (3) of a first metal sheet (1) and has a bead (17) facing the first metal sheet (1).

4. The flat gasket according to claim 1, wherein the second metal sheet (4) has at least one second bead (5) in the area of the first bead (3).

5. The flat gasket according to claim 4, wherein the second bead (5) is designed to be different from the first bead (3).

6. The flat gasket according to claim 5, wherein the second bead (5) has a profile with a smaller cross section than the first bead (3).

7. The flat gasket according to claim 1, wherein a third metal sheet (8) is arranged between the first metal sheet (1) and the second metal sheet (4); and the third metal sheet is included in the connection between the first metal sheet (1) and the second metal sheet (4).

8. The flat gasket according to claim 7, wherein the second metal sheet (4) has at least one second bead (5) in the area of the first bead (3) and wherein the third metal sheet (8) has a third bead (6) in the area of the first bead (3) and the second bead (5), the third bead having a differently shaped profile.

9. The flat gasket according to claim 8, wherein the first bead (3), the second bead (5) or the third bead (6) are subdivided into at least two partial beads (12).

10. A cylinder head gasket comprising at least two flat gaskets according to claim 1.

11. The flat gasket according to claim 1, wherein the second metal sheet (4) has a mirror-image second bead (5) which corresponds to the bead (3) of the first metal sheet (1).

12. The flat gasket according to claim 1, wherein the first metal sheet (1) has an offset (16) which corresponds essentially to the dimension of the height of the first bead (3), and a bead (5) on the second metal sheet (4) engages beneath this offset (16).

13. A flat gasket for a reciprocating engine or a driven machine having a cylinder head, comprising: at least a first laminated metal sheet (1) and a second laminated metal sheet (4) both 0.05 to 0.5 mm thick, both provided with a coating of an elastomer film at least on a side facing outward and both having an edge area, said edge area formed by at least one of an outer contour of the cylinder head, a cylinder bore or a water or oil passage in the cylinder head, said edge area adjacent to at least one peripheral first bead (3) of the first metal sheet (1), the second metal sheet (4) bridging the first bead (3), wherein the two metal sheets (1, 4) are permanently joined together by connections on both sides of the first bead (3), and wherein the first metal sheet (1) has an offset (16) which corresponds essentially to the dimension of the height of the first bead (3), and a bead (5) on the second metal sheet (4) engages beneath this offset (16).

* * * * *